United States Patent Office 3,485,812
Patented Dec. 23, 1969

3,485,812
PROCESSES FOR PREPARING ETHYLENE POLYMERS
Harry D. Anspon, Kansas City, Mo., and Francis E. Brown, Orange, Tex., assignors to Gulf Research & Development Company, Pittsburgh, Pa., a corporation of Delaware
No Drawing. Filed Aug. 30, 1966, Ser. No. 575,983
Int. Cl. C08f 3/04
U.S. Cl. 260—94.9
4 Claims

ABSTRACT OF THE DISCLOSURE

A process for preparing free-radical produced ethylene polymers is disclosed in which tetraalkyl stilbene quinones are added to the polymerization reaction in minor quantities. The tetraalkyl stilbene quinones modify the properties of the resulting polymers, particularly by providing both improved strength and optical properties. The products so obtained are free from the tendency to discolor which is sometimes observed when hindered phenols are used for a similar purpose.

---

This invention relates to processes for the preparation of ethylene polymers.

More particularly, the invention concerns polyethylene processes conducted in the presence of so-called "chain stopping" compounds.

In a further particular aspect, the invention concerns processes conducted in the presence of chain stopping compounds for preparing polyethylene resins especially adapted for use in fabricating films having the combination of improved color characteristics and improved optical and strength properties.

In still another aspect, the invention relates to novel polyethylene products prepared in accordance with the process herein described in which the chain stopping agent is chemically combined with the polymer, forming a new composition of matter.

Processes for preparing polymers of ethylene such as the homopolymer, polyethylene, and various copolymers of ethylene with other polymerizable comonomers having a wide variety of functional groups are well known. A comprehensive survey of such processes is found in the article entitled "Polyolefin Processes Today," by Marshall Sittig, appearing in volume 39, No. 11, Petroleum Refiner (1960). Accordingly, it is considered that a detailed discussion of such processes is not necessary at this point, the invention herein described being broadly applicable to ethylene polymerization processes in general, including processes for preparing ethylene copolymers.

According to certain known improvements in ethylene polymerization processes, various properties of the polymers are improved by carrying out the polymerization in the presence of so-called "chain stopping" agents. Also, it is known that certain process advantages, for example, the prevention of explosive decompositions in high pressure processes, can be achieved by effecting the polymerization in the presence of these chain stopping compounds.

The hindered phenols are widely used in such prior art processes as chain stopping agents. These compounds have achieved wide acceptance as chain stopping agents as a result of their efficacy in improving the optical and strength characteristics of ethylene resins, particularly polyethylene. The mononuclear hindered phenols constitute a generally preferred class of chain stopping compounds, in particular, compounds such as, illustratively, 2,6-ditertiarybutyl-4-methyl phenol, 2,6-ditertiarybutyl-4-ethyl phenol, and the like.

Resins prepared according to the prior art processes employing the hindered phenols as chain stopping compounds often have undesirable color characteristics. For example, these resins may either by discolored as manufactured or may develop discoloration upon aging, particularly where exposed to sunlight and other forms of actinic or ionizing radiation. The often undesirable color characteristics of resins produced in the presence of prior art chain stopping compounds severely detracts from their utility in many applications, particularly when employed as packaging resins such as for films, bottles and the like.

Accordingly, it would be highly desirable to provide a class of chain stopping agents useful in the preparation of ethylene polymers such as polyethylene and various ethylene copolymers which provide equivalent or improved efficiency insofar as their effect upon the properties of the polymers produced or in achieving process advantages, but which do not induce undesirable color characteristics in the polymer.

The present invention contemplates improvements in known processes in which the polymerization of ethylene is carried out in the presence of a chain stopping agent, the improvement being the provision of a novel class of chain stopping agents which are particularly adapted to the manufacture of ethylene resins, especially polyethylene, which have significantly improved color characteristics in comparison to such resins prepared in accordance with prior art techniques.

The invention is grounded in the discovery that normally highly colored oxidation products obtained from the dimers of monohydric mononuclear hindered phenols, heretofore commonly employed as chain stopping agents, may themselves be effective as chain stopping agents without inducing undesirable color characteristics in the polymer so produced. This is especially surprising in view of the fact that such oxidized dimers have been identified as the chromophores which cause the discoloration of polymers produced in the presence of the parent monomeric chain stopping compound. The invention is further based on the discovery that when such oxidized dimers are injected or otherwise introduced into the polymerization reaction mixture, they are consumed during the course of the polymerization reaction, yielding a substantially colorless product which is not subject to discoloration upon aging. Thus, by introducing into the polymerization mixture the very compound which was formerly desired to be excluded from the resulting polymer, the substantial advantages of a chain stopped resin, or process advantages in the manufacture thereof, are realized without concomitantly inducing undesirable color characteristics in the product resin.

At present, the invention is most advantageously applied to the production of polyethylene according to the familiar so-called "high pressure" polymerization process. This process, briefly described, comprises forming a polymerization mixture of ethylene, a free-radical generating polymerization initiator and a chain stopping compound, subjecting the mixture to polymerizing conditions of temperature and pressure and separating the polymer from the mixture. In a typical continuous process of this type, the polymerization is carried out in a polymerization zone within a stirred autoclave or tubular reactor, the unreacted components of the mixture being recycled to the polymerization zone after separation from the polymer.

The novel class of chain stopping compounds contemplated in the present invention are tetraalkyl stilbene quinones, which are oxidized dimers of the corresponding monohydric mononuclear hindered phenols. Of this class, the compound 3,5,3',5'-tetratertiarybutyl stilbene quinone is presently preferred; this compound is also designated 4,4'-ethanediylidenebis(2,6-di-tert-butyl-2,5-cyclohexadien-1-one) according to Chemical Abstracts nomenclature. These compounds are known in the prior art and may be prepared, for example, by the techniques described in the United States Patent to Gleim et al., U.S. Patent No. 2,593,746. The tetratertiarybutyl stilbene quinone compound is brilliant red in color and is useful as a dye according to the disclosure of the Gleim patent, supra. As little as 1–2 p.p.m. of tetratertiarybutyl stilbene quinone in polyethylene induces a distinct yellow discoloration. Surprisingly, however, polyethylene produced according to the techniques herein disclosed is essentially completely colorless although considerably greater quantities of tetratertiarybutyl stilbene quinone are present in the polymerization mixture during the preparation of the resin. It has been observed that the tetratertiarybutyl stilbene quinone is consumed or otherwise destroyed during the course of the polymerization reaction, the reaction product being a novel adduct of ethylene and tetratertiarybutyl stilbene quinone which is essentially colorless. The novel product contains no detectable quantity of the quinone compound and no other isolatable aromatic or non-aromatic compound.

The quantity of the quinone compound employed in accordance with our invention will, of course, depend primarily upon the desired objective of introducing the chain stopping compound and, in turn, upon the specific process conditions encountered. Thus, according to a presently preferred embodiment of the invention, we employ the dimer-derived quinone compound hereabove described in conjunction with processes described in co-pending application Ser. No. 540,185, now Patent No. 3,349,072 filed May 5, 1966, wherein the inventors describe an improved high pressure polyethylene process which is especially adapted to the production of resins particularly suited to the fabrication of films having a unique and significantly improved combination of strength and optical properties. As an essential feature of the process described in said co-pending application, various chain stopping compounds are employed in amounts which are notably greater than were employed in prior art processes employing chain stopping compounds for other purposes. As an example, it is disclosed in said co-pending application that as high as 500–600 parts of 2,6-ditertiarybutyl-4-methyl phenol per million parts of ethylene feed to the polymerization reactor are employed in order to obtain the desired improvement in the strength and optical properties of the resin. The use of such high quantities of this particular chain stopping compound frequently leads to severe discoloration problems unless certain precautions are observed. By contrast, however, if one employs 3,5,3',5'-tetratertiarybutyl stilbene quinone as the chain stopping agent, these discoloration problems are completely avoided without sacrificing the desired improvement in strength and optical properties, even though equivalent molar quantities of the dimer-derived quinone compound are employed.

Similarly, where chain stopping compounds of the prior art are employed to prevent explosive decompositions in the manufacture of ethylene copolymers by high pressure polymerization techniques, discoloration induced by the presence of the chain stopping agent can be avoided by the introduction of an effective quantity of the corresponding dimer-derived quinone compound. Thus, according to a known process, copolymers of ethylene and alkyl acrylates are prepared in a high pressure autoclave process in the presence of 2,6-ditertiarybutyl-4-methyl phenol chain stopping compound. The minimum quantity of the phenolic chain stopping compound is dictated by the requirement of a sufficient quantity to prevent explosive decompositions. According to the present invention, discoloration problems engendered by the use of monomeric 2,6-ditertiarybutyl-4-methyl phenol are avoided by substituting an equivalent molar quantity of the dimer-derived quinone compound 3,5,3',5'-tetratertiarybutyl stilbene quinone.

Also, according to the techniques disclosed in U.S. Patent No. 2,960,496 to Elder, pre-polymerization of ethylene in the ethylene compression system is avoided by introducing an effective quantity of 2,6-ditertiarybutyl-4-methyl phenol into the ethylene feed prior to its compression. Of course, this chain stopping compound carries over into the polymerization reactor where it can form the chromophore and induce discoloration of the resin. In accordance with the techniques of the present invention, discoloration can be avoided by substituting the corresponding dimer-derived quinone compound in approximately equivalent molar quantities instead of the phenolic compound.

In another process disclosed in U.S. Patent No. 2,566,537 to Schmerling, the melting point of the ethylene polymer is adjusted by effecting the polymerization in the presence of various compounds including hindered phenols such as, illustratively, 2,6-ditertiarybutyl-4-methyl phenol and 2,4-dimethyl-6-tertiarybutyl phenol. According to the present invention, discoloration problems arising from the formation of highly colored oxidation products from dimers of these compounds can be avoided, without sacrificing the objectives of the Schmerling process, by the substitution of the corresponding dimer-derived quinone compound for the phenolic compound contemplated by the Schmerling patent.

In another process disclosed by Harding in U.S. Patent No. 2,801,225, rancid odor development in polyethylene is prevented by incorporating an effective amount of trialkyl-substituted monohydric hindered phenols. While the Harding patent discloses that these hindered phenols are incorporated by mixing with the polymer subsequent to the polymerization reaction, later work has demonstrated that equivalent results can be achieved by injecting the phenolic compound directly into the polymerization reactor or even into the compressed ethylene feed to the reactor. Apparently, the phenolic compound survives the polymerization reaction conditions and is present in the finished polymer to achieve the results desired by Harding. However, whether injected into the reactor, into the feed to the reactor or post-mixed with the polymer, it has been noted that the highly colored oxidation products of dimers of these phenolic compounds induce discoloration of the polymer during aging. According to the process of the present invention, such discoloration is prevented by employing the corresponding dimer-derived quinone compound instead of the hindered phenol contemplated by Harding. Illustratively, the compound 3,5,3',5'-tetratertiarybutyl stilbene quinone is substituted for 2,6-ditertiarybutyl-4-methyl phenol in approximately equivalent molar quantities. There are even indications that this substitution can be made even though the quinone compound is post-mixed with the polymer. Although this results in initial discoloration of the polymer, subsequent working under high shear conditions, such as in a Banbury mixer, causes the discoloration to disappear yielding a highly stable product with no tendency to discolor under the usual conditions.

It is not possible nor required to the understanding of this invention to state any specific quantity of the dimer-derived quinone compound which must be employed in order to achieve the advantageous results of the present invention. Suffice it to say that the quantity of the dimer-derived quinone compound to be employed as a substitute for the monomeric phenolic chain stopping compound will depend upon the objective originally desired, viz, improvement of strength or optical properties, prevention of explosive decompositions, increase in melting point, prevention of odor development, etc., prevention of pre-polymerization, etc., and, in general, the dimer-derived quinone compound will be employed in molar quantities approximately equivalent to that originally required if the monomeric phenolic compound is employed.

The exact optimum quantities of the dimer-derived quinone compound to be employed can thus be determined by routine experimentation by those of ordinary skill in the art having regard for the present disclosure.

EXAMPLE

The following example illustrates a presently preferred embodiment of the invention in which the dimer-derived quinone compound is employed in a process such as contemplated by copending application Ser. No. 540,185, now Patent No. 3,349,072, filed May 5, 1966, supra. The objective of the process is the preparation of a polyethylene resin especially adapted for fabrication into film having an improved combination of strength and optical properties. In this process, it is preferred to employed a polymerization initiator having a half life at 185° F. of from about 5 to about 50 minutes, desirably from about 20 to about 40 minutes, as determined by the method of Doehnert and Mageli, Modern Plastics 36, 142 (February 1959). The pressure in the polymerization zone is maintained at above 14,000 p.s.i.g., preferably from about 17,000 to about 35,000 p.s.i.g., and the initiation temperature in the polymerization zone is maintained at above 250° F., preferably from about 310° F. to about 480° F.

The process may be carried out as a batch operation by introducing suitable quantities of initiators, various modifiers or molecular weight-control agents known in the art and the quinone compound into a reactor equipped with a mixing device, pressurizing the reactor with ethylene and heating the contents to the polymerization temperature while mixing the contents of the reactor, cooling after a suitable period of time and recovering the polymer. However, certain difficulties are encountered in properly controlling the batch reaction as the quinone compound appears to function as a highly effective free-radical scavenger, thus tending to suppress the initiator activity and even "killing" the polymerization reaction under certain conditions. Therefore, the preferred method of operation is a continuous process wherein the ethylene feed is continuously introduced under pressure into an autoclave or tubular reactor, the initiator, dissolved in an appropriate solvent, is simultaneously introduced into the reactor and appropriate quantities of the quinone compound and other desired materials such as molecular weight modifiers, telogens, etc., are introduced in any suitable manner which provides proper mixing to form the polymerization mixture with the various elements thereof being more or less uniformly distributed to provide proper contact. After suitable residence time within the reactor, the materials are continuously withdrawn through a pressure let-down valve, the polyethylene resin separated therefrom, and unreacted materials may be recycled to the reactor.

In the particular process chosen for purposes of illustrating the invention, the polymerization mixture contains a quantity of the quinone compound which is appropriate to achieve the objective of substantially improving the strength and optical properties of films fabricated from the resins so produced. The exact amount of the quinone compound to be introduced into the reactor is not highly critical, it generally being effective to introduce at least about 0.0006 to about 0.06 mol of quinone compound per mol of ethylene feed to the reactor. However, smaller amounts are at least partially effective, and somewhat larger amounts, although not required, are not believed harmful.

A series of polymerization runs are made according to the process of the working example. Ethylene feed under pressure and at a temperature of about 100° F. is continuously introduced through a feed inlet into the top of a stirred polymerization reactor. The polymerization initiator, decanoyl peroxide, is continuously introduced into the reactor and mixed with the ethylene feed. The quinone compound, 3,5,3',5'-tetratertiarybutyl stilbene quinone, is mixed with the ethylene feed prior to its introduction into the reactor at a rate of 0.006 mol of quinone per mol of ethylene feed. The initiation temperature is controlled at 350° F. by regulating the ratio of initiator to ethylene feed.

The polymerization mixture comprising polyethylene and unpolymerized ethylene is withdrawn from the bottom of the reactor through a let-down valve at a rate substantially equal to the ethylene feed rate. The pressure within the reactor is maintained at 14,500 p.s.i.g. by regulating the pressure drop across the let-down valve. The polyethylene is separated and recovered from the polymerization mixture and unpolymerized ethylene is recycled to the feed inlet.

The above procedure is repeated except that 2,6-ditertiarybutyl - 4 - methyl phenol is substituted for the quinone compound.

In comparison to the film prepared from the resin polymerized in the presence of the phenol compound, film prepared from the resin in the presence of the quinone compound has lower "haze" (ASTM D 1003–59T) and higher "gloss" (ASTM D 523–53T). Other resin and film properties are substantially equivalent. The resin prepared in the presence of the quinone compound shows no discoloration upon manufacture and no tendency to become discolored during aging.

Having fully described our invention and the presently preferred embodiments thereof, we claim:

1. In a high-pressure, free-radical polymerization process for preparing polymers of ethylene in the presence of a chain-stopping compound, the improvement comprising effecting said polymerization in the presence of a tetraalkyl stilbene quinone that is added to the reaction mixture.

2. Process of claim 1 wherein said quinone is 3,5,3',5'-tetratertiarybutyl stilbene quinone.

3. In a process for preparing polyethylene including forming a polymerization mixture of ethylene, a free-radical generating polymerization initiator and a chain-stopping compound, subjecting said mixture to high-pressure, free-radical polymerization conditions and separating the polymer from said mixture, the improvement comprising adding a tetraalkyl stilbene quinone to said reaction mixture.

4. Process of claim 3 wherein said quinone is 3,5,3',5'-tetratertiarybutyl stilbene quinone.

References Cited

UNITED STATES PATENTS

| 2,566,537 | 9/1951 | Schmerling | 260—94.9 |
| 2,893,985 | 7/1959 | Powelson | 260—94.9 |
| 2,956,982 | 10/1960 | McCall et al. | 260—94.9 |
| 2,999,856 | 9/1961 | Bestian et al. | 260—94.9 |
| 3,090,778 | 5/1963 | Ehrlich et al. | 260—94.9 |
| 3,119,804 | 1/1964 | Harlow | 260—94.9 |
| 3,274,167 | 9/1966 | Doak et al. | 260—94.9 |
| 3,317,504 | 5/1967 | Kinkel et al. | 260—94.9 |
| 3,334,081 | 8/1967 | Madgwick et al. | 260—94.9 |
| 3,349,072 | 10/1967 | Alexander et al. | 260—94.9 |
| 3,377,330 | 4/1968 | Mortimer | 260—94.9 |

OTHER REFERENCES

Roberts et al., Organic Chemistry, W. A. Benjamin, Inc., New York, 1964, QD 25, R58 (pages 1110–1111).

JOSEPH L. SCHOFER, Primary Examiner

EDWARD J. SMITH, Assistant Examiner

U.S. Cl. X.R.

260—45.7